United States Patent
Lester et al.

(10) Patent No.: US 11,413,845 B2
(45) Date of Patent: Aug. 16, 2022

(54) STRETCH LAMINATE

(71) Applicant: APLIX, Le Cellier (FR)

(72) Inventors: Donald Harley Lester, Charlotte, NC (US); Andrew Robert Horne, Fort Mill, SC (US); Alexander James Neeb, Charlotte, NC (US)

(73) Assignee: APLIX, Le Cellier (FR)

( * ) Notice: Subject to any disclaimer, the term of this patent is extended or adjusted under 35 U.S.C. 154(b) by 312 days.

(21) Appl. No.: 16/171,411

(22) Filed: Oct. 26, 2018

(65) Prior Publication Data

US 2019/0126587 A1 May 2, 2019

Related U.S. Application Data

(60) Provisional application No. 62/578,644, filed on Oct. 30, 2017.

(51) Int. Cl.
| | |
|---|---|
| *B32B 5/04* | (2006.01) |
| *B32B 5/22* | (2006.01) |
| *B32B 27/08* | (2006.01) |
| *B32B 27/12* | (2006.01) |
| *B32B 27/32* | (2006.01) |
| *B32B 5/02* | (2006.01) |
| *B32B 27/30* | (2006.01) |

(52) U.S. Cl.
CPC ............... *B32B 5/04* (2013.01); *B32B 5/022* (2013.01); *B32B 27/08* (2013.01); *B32B 27/12* (2013.01); *B32B 27/302* (2013.01); *B32B 27/32* (2013.01); *B32B 2250/02* (2013.01); *B32B 2250/24* (2013.01); *B32B 2262/0253* (2013.01); *B32B 2307/51* (2013.01); *B32B 2307/54* (2013.01); *B32B 2307/5825* (2013.01); *B32B 2307/718* (2013.01); *B32B 2307/732* (2013.01); *B32B 2555/00* (2013.01); *B32B 2555/02* (2013.01)

(58) Field of Classification Search
None
See application file for complete search history.

(56) References Cited

U.S. PATENT DOCUMENTS

| | | | |
|---|---|---|---|
| 6,069,097 A | 5/2000 | Suzuki et al. | |
| 7,794,819 B2 | 9/2010 | Black et al. | |
| 2010/0041293 A1* | 2/2010 | Anderson | B32B 37/144 442/328 |
| 2014/0093703 A1* | 4/2014 | Hanschen | B32B 25/10 428/175 |
| 2014/0276517 A1* | 9/2014 | Chester | D04H 1/5412 604/372 |

(Continued)

FOREIGN PATENT DOCUMENTS

| | | |
|---|---|---|
| EP | 1783257 A1 | 5/2007 |
| EP | 1900512 A1 | 3/2008 |

(Continued)

*Primary Examiner* — Shawn Mckinnon

(74) *Attorney, Agent, or Firm* — Hammer & Associates, P.C.

(57) ABSTRACT

A stretch laminate for use in hygiene products includes: an extensible, non-elastic spunbond or spunmelt nonwoven laminated to an elastic film; and the stretch laminate is activated, has a cross direction (CD) elongation at 10N in a range of 80-150% for a 50 mm sample width, and has fractures of less than 10% of the stretch laminate.

14 Claims, 8 Drawing Sheets

(56) References Cited

U.S. PATENT DOCUMENTS

| | | | |
|---|---|---|---|
| 2014/0378924 A1* | 12/2014 | Turner | ............... B32B 7/12 |
| | | | 604/365 |
| 2015/0322605 A1 | 11/2015 | Chester et al. | |
| 2017/0037551 A1 | 2/2017 | Uwe et al. | |
| 2018/0002846 A1 | 1/2018 | Novarino et al. | |

FOREIGN PATENT DOCUMENTS

| | | |
|---|---|---|
| EP | 2158888 A1 | 3/2010 |
| JP | H07-252762 A | 10/1995 |
| WO | WO 2016/107698 A1 | 7/2016 |
| WO | WO 2017/148865 A1 | 9/2017 |

\* cited by examiner

STRETCH LAMINATE

RELATED APPLICATION

This application claims the benefit of U.S. provisional application Ser. No. 62/578,644 filed Oct. 30, 2017, incorporated herein by reference.

FIELD OF THE INVENTION

The invention is directed to stretch laminates, particularly to stretch laminates used in hygiene products.

BACKGROUND

Stretch laminates are used, for example, in the construction of hygiene products. Hygiene products may include, but are not limited to: diapers, absorbent articles, training pants, youth pants, adult incontinence products, and the like. For example, see U.S. Pat. No. 7,794,819 and the references cited therein, each of which is incorporated herein, in their entirety, by reference.

In general, a stretch laminate may be a structure having two or three layers laminated together, so that the laminated structure is elastic (e.g., stretchable and recoverable) in at least one direction. The two-layer laminate typically includes a non-woven fabric laminated to an elastic film, and the three-layer laminate typically includes two non-woven fabrics sandwiching the elastic film.

Stretch laminates may be used as various components of the hygiene product (e.g., members joining the front and back absorbent portions of the hygiene product together releasably or fixedly). In one example, the stretch laminate is used to form the 'side panel ears' and/or 'tabs' of the hygiene product. The side panel ears and/or tabs are used to secure the hygiene product around the waist of the wearer. Typically, the side panel ears and/or tabs are affixed to the lateral rear portions of the hygiene products and may be releasably fastened to the front portion of the hygiene product (or fixedly fastened), when that product is in use on the wearer.

These side panel ears or tabs are typically elastic. The elasticity of the side panel ears or tabs helps to insure a secure and snug fit of the hygiene product to the wearer. In use, for example, the side panel ears and/or tabs may be stretched from the rear portion of the product and around the wearer and are releasably fastened to the front of the product, and the side panel ears and/or tabs retract to provide the secure and snug fit to the wearer.

As the stretch laminates used in hygiene products have evolved over time, e.g., to improve quality and reduce price, a preferred nonwoven is a spunbond or spunmelt nonwoven. While stretch laminates made with the spunbond or spunmelt nonwoven meet the needs for use in such hygiene products, these stretch laminates may be improved.

For example, when stretch laminates made with spunbond or spunmelt nonwoven are stretched during manufacture (e.g., activation), the nonwoven may fracture. To understand fracture (or fracturing), see FIG. 1. In FIG. 1, a prior art spunbond nonwoven has been stretched, the fractures appear as dark areas where the spunbond nonwoven has broken (i.e., the fibers of the nonwoven have separated or unbonded). When such fracturing occurs, the elastic layer of the stretch laminate is exposed. Exposure of the elastic layer is not preferred and gives the feeling of poor quality of the product or degraded/corrupted product or the feeling that the product will break/crack.

Accordingly, there is a need for a stretch laminate where the spunbond or spunmelt nonwoven does not fracture (or the amount of fracture is reduced) when the stretch laminate is stretched (e.g., during activation and/or subsequent use).

SUMMARY OF THE INVENTION

A stretch laminate for use in hygiene products includes: an extensible, non-elastic spunbond or spunmelt nonwoven laminated to an elastic film; and the stretch laminate is activated, has a cross direction (CD) elongation at 10N in a range of 80-150% for a 50 mm sample width, and has fractures of less than 10% of the stretch laminate.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 4A is a representative ring roller and FIG. 4B illustrates a no intermeshing of rings (left side) and intermeshing of rings (left side).

DESCRIPTION OF THE INVENTION

The invention is directed to a stretch laminate, particularly a stretch laminate used in a hygiene product, and more particularly a stretch laminate used as a side panel ear or tab in a hygiene product.

Figure 1:
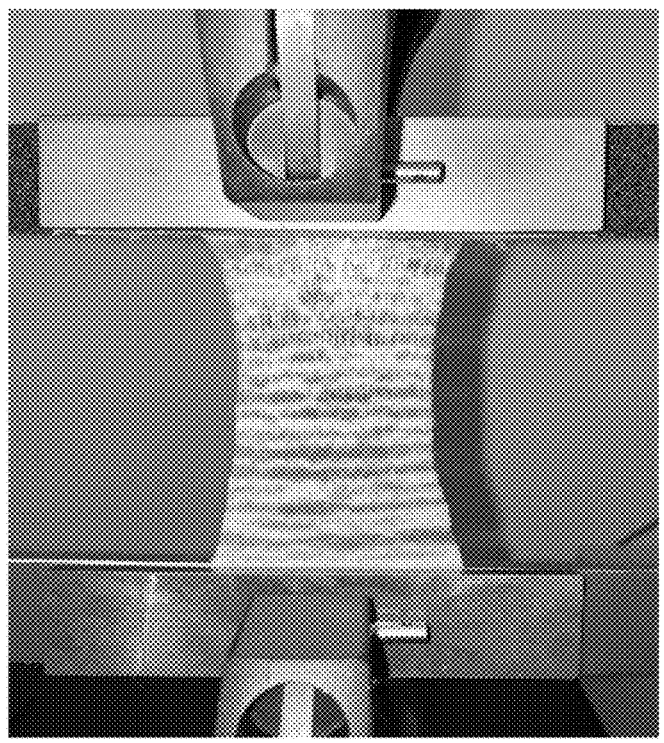
FIG. 1 illustrates a prior art stretch laminate made with a spunbond or spunmelt nonwoven showing fractures in the nonwoven in a stretched state.
Figure 2:
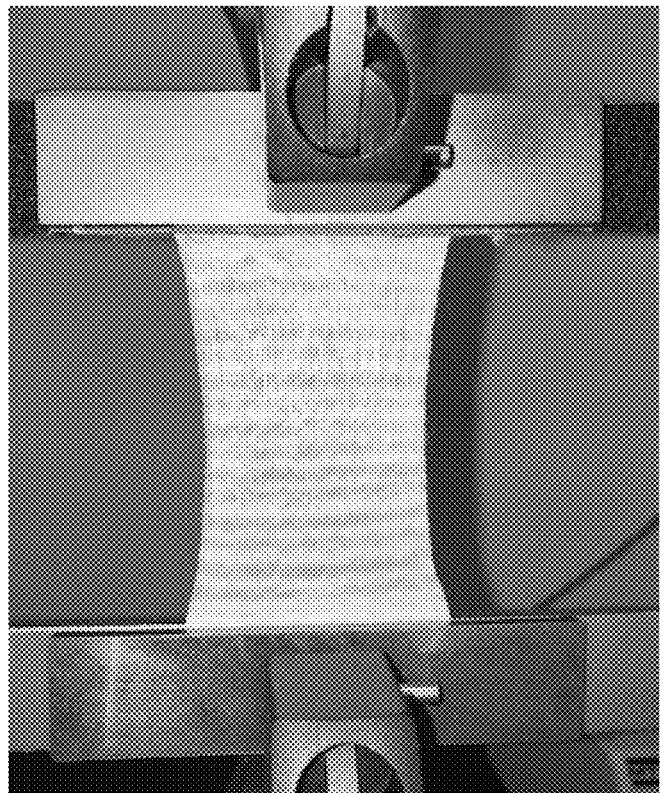
FIG. 2 illustrates the invention, a stretch laminate made with a spunbond or spunmelt nonwoven, that has no fractures in a stretched state.

By this invention, fracturing may be reduced or eliminated by providing a stretch laminate with a nonwoven having particular properties, discussed below. The inventive stretch laminate is a stretch laminate where one nonwoven (e.g., a spunbond or spunmelt nonwoven) does not fracture (or the amount of fracture is reduced) when the stretch laminate is stretched (e.g., during activation and/or subsequent use). To understand non-fracture, compare FIG. 1 and FIG. 2. FIG. 1 illustrates a fractured nonwoven, and FIG. 2 illustrates a non-fractured spunbond nonwoven (note the amount of stretch applied to the stretch laminates in FIG. 1 and FIG. 2 is the same). In FIG. 2, the amount of fracture is reduced (or eliminated). Fracture will be explained in greater detail below.

In general, a stretch laminate may include a nonwoven layer laminated to an elastic layer. The stretch laminate may be a three-layer structure (two nonwoven layers laminated to and sandwiching the elastic layer) or a two-layer structure (one nonwoven layer laminated to the elastic layer). Hereinafter, the stretch laminate will be discussed as a three-layer structure, but this discussion is equally applicable to a two-layer structure.

The nonwovens of the stretch laminate may be different or the same. Any nonwoven may be used. The nonwoven may have a basis weight in the range of 5-25 grams per square meter (gsm) or 10-20 gsm.

One (or the first) nonwoven may be an extensible, non-elastic spunbond or spunmelt nonwoven. Spunmelt nonwoven, as used herein, may be any spunmelt nonwoven, such spunmelt (e.g., SMS) nonwovens may include, but are not limited to, SM, SMS, SSMMS, SMSMS, SMMMS, SMMS, SSMMSS, SSMMMSS, SSMMMSSS, or any other combination of S and M layers, S representing a spunbond type layer and M representing a meltblown type layer. The first nonwoven may be made of any material or polymeric material. In one embodiment, the first nonwoven is made of one material selected from the group of: polyolefin (PO— e.g., polyethylene or polypropylene), polyester, polyamide (PA), acrylonitrile butadiene styrene (ABS), acrylic, polystyrene (PS), cellulosic, fluorocarbon, polylactic acid (PLA), and combinations thereof. In another embodiment, the polyolefin may be polypropylene. In one embodiment, the first nonwoven may have a cross machine direction (CD) elongation at break in a range of 80-120% per 50 mm width. In one embodiment, the first nonwoven may have a cross machine direction (CD) elongation at peak load in a range of 80-120% per 50 mm width. In one embodiment, the nonwoven is a spunbond nonwoven. The first nonwoven may be the nonwoven described in WO2016/107698 (=US2018/ 0002846), incorporated herein by reference. The first nonwoven may be the nonwoven described in WO2017/148865, incorporated herein by reference.

The second (or optional) nonwoven may be the same or different from the first nonwoven. The second nonwoven may be a carded nonwoven, a spunlaced nonwoven, a spunbonded nonwoven, and/or a spunmelt nonwoven. In one embodiment, the second nonwoven may be a carded nonwoven. In one embodiment, the second nonwoven may be a spunmelt (e.g., SMS) nonwoven. In one embodiment, the second nonwoven may be a spunbond nonwoven. In another embodiment, the second nonwoven may be spunlaced nonwoven. In yet another embodiment, the second nonwoven is a spunmelt (e.g., SMS) nonwoven selected from the group consisting of: SM, SMS, SSMMS, SMSMS, SMMMS, SMMS, SSMMSS, SSMMMSS, SSMMMSSS, or any other combination of S and M layers, S representing a spunbond type layer and M representing a meltblown type layer.

Figure 3:
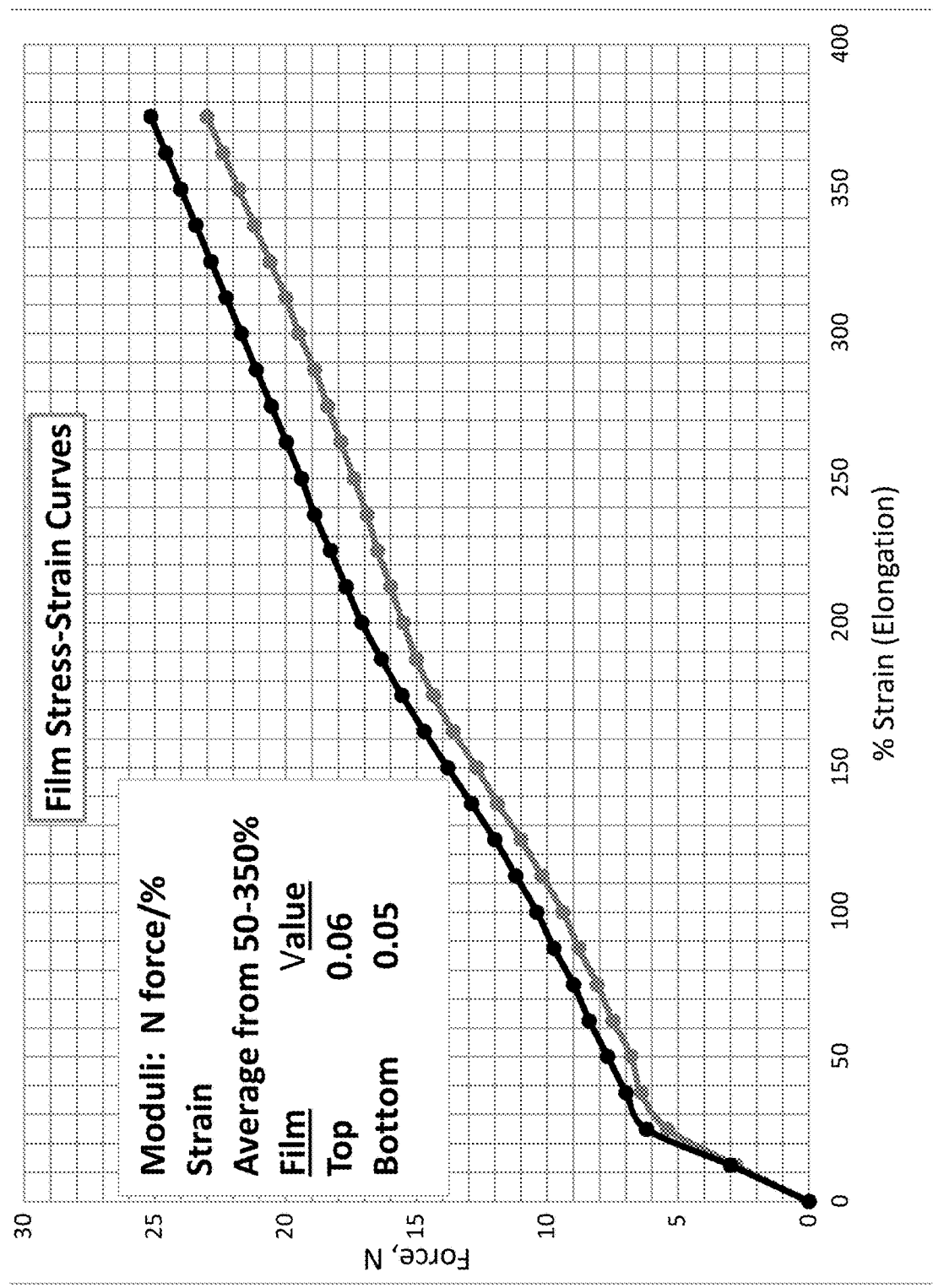
FIG. 3 is a graph illustrating a stress-strain curve, where the X-axis is the % strain and the Y-axis is force (N).

The elastic film (or material) may be any elastic film (or material). Elastic material means a material (or film) suitable to be stretched under the effect of a stretching force exerted in the lateral direction and to recover, substantially, to its initial shape and dimensions after releasing the stretching force. For example, it may be a material that retains a residual deformation or remanence after elongation and release (residual deformation also called "permanent set" or "SET") of less than 30 percent, or less than 20 percent, or less than 15 percent, or less than 10 percent, or for example less than 0.5 percent, of its initial dimension (before elongation) for an extension of 100 percent of its initial dimension, at room temperature (23° C.). The SET may be measured as indicated in patent application EP1783257, the content of which is incorporated by reference, and in particular paragraphs [0056] to [0062] of publication EP1783257 A1 which details an example of a SET measurement. In one embodiment, the elastic film is made of a styrenic block co-polymer. The elastic film may have a basis weight in the range of 30-60 grams per square meter (gsm) or 40-60 gsm and may have a thickness in the range of 75-125 micrometers (or microns). The thickness is measured when the elastic film is in state of rest (i.e., not stretched). In one embodiment, the elastic film may have a modulus over a range of 50-350% elongation in a range of 0.045-0.065 N force/% strain for a 75 mm sample width. In another embodiment, the modulus may be in a range of 0.050-0.060 N/% strain for a 75 mm sample width. The modulus is illustrated in FIG. 3 where the X-axis is the % strain and the Y-axis is force (N).

The layers of the stretch laminate may be laminated together. Lamination may be by any conventional technique. Conventional lamination techniques include, for example: adhesive bonding, thermal bonding, ultrasonic bonding, pressure bonding, and combinations thereof. The nonwoven, in particular the first, nonwoven, may have a basis weight on the range of from 5-25 g/m². The nonwoven, in particular the first, may have surface of the bonded areas is in the range of 5-20% (or 8-15%) of the total surface of the side, and the surface of the non-bonded area of the nonwoven, in particular the first, may be in the range of 80-95% of the total surface of the side. The nonwoven, in particular the first, may have individualized bonded areas in the form of rods each in their length direction form an angle of 90' with the machine direction of the web. The nonwoven, in particular the first, may have surface of the bonded areas arranged in such a way that in the machine direction of the nonwoven no uninterrupted regions exist along the nonwoven while in the cross direction of the nonwoven the arrangement of the bonded area defines a plurality of uninterrupted regions that extend continuously along the web.

Figure 4A:
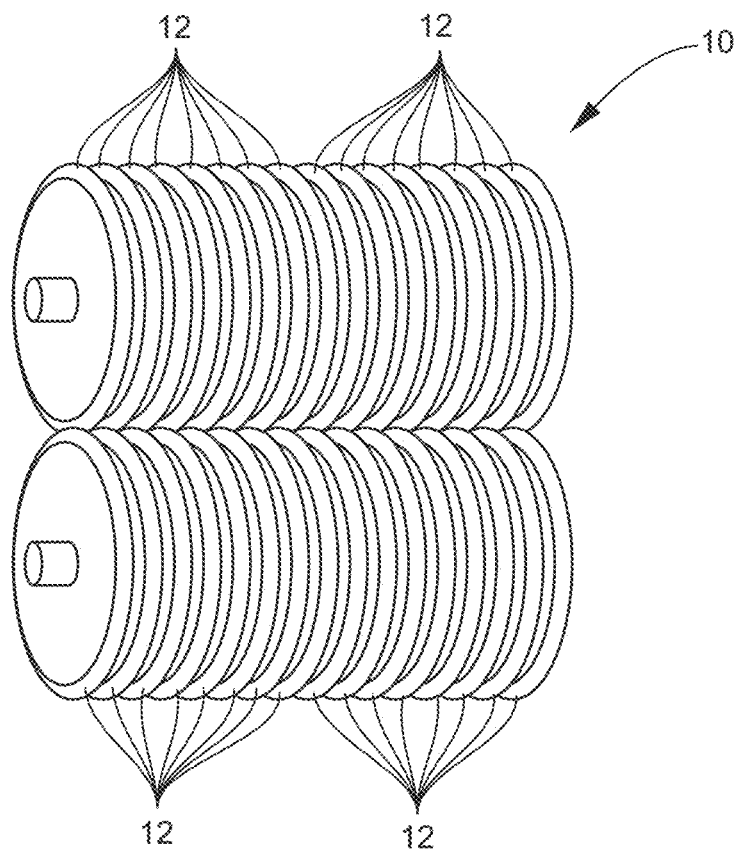
FIGS. 4A and 4B illustrate an embodiment of activation by a ring roller.
Figure 4B:
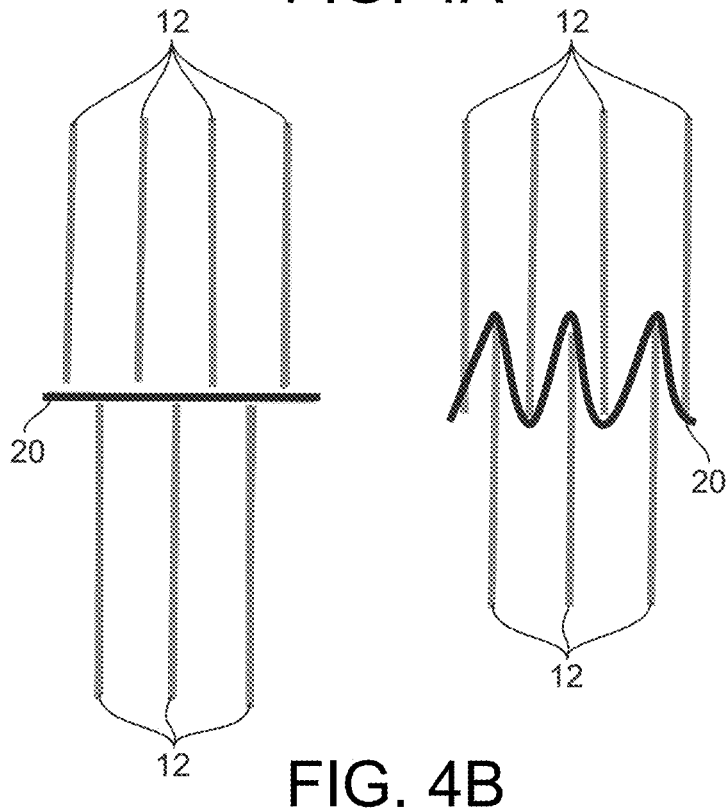

The stretch laminate may be activated. In one embodiment, activation may be incremental stretching of the laminate by, for example, a ring-roller, see for example U.S. Patent Publication No. 2014/0378924, incorporated herein by reference. The amount of activation, measured as applied strain (see U.S. Patent Publication No. 2014/0378924), may be in the range of 130-180%. For a further explanation of applied strain, refer to FIGS. 4A-4B and Table 1 below. FIG. 4A is an illustration of a ring roller 10. FIG. 4B is a schematic illustration of how the rings 12 of the ring roller 10 intermesh (looking in the machine direction (MD)). The left side of FIG. 4B shows no intermeshing (i.e., no incremental stretching of the stretch laminate 20), while the right side show the rings intermeshed (i.e., incremental stretching of the stretch laminate 20). Table 1 is a chart showing the applied strain (%) as the rings intermesh (intermeshing is quantified by overlap or engagement (mm) of the rings).

TABLE 1

| Block # | Engagement (mm) | Applied Strain (%) |
|---|---|---|
| 100 | 3.228 | 97% |
| 110 | 3.482 | 109% |
| 120 | 3.736 | 121% |
| 130 | 3.990 | 133% |
| 140 | 4.244 | 145% |
| 150 | 4.498 | 157% |
| 160 | 4.752 | 169% |
| 170 | 5.006 | 182% |
| 180 | 5.260 | 194% |
| 190 | 5.514 | 207% |
| 200 | 5.768 | 220% |

In the following discussion of the stretch laminate physical properties, the stretch laminate has a polypropylene spunbond nonwoven, an elastic film, and the second nonwoven is a carded nonwoven. If other second nonwovens are used the properties of the stretch laminate may change. These physical properties are determined using a 'constant rate of extension' tester (e.g., Instron or MTS—commonly available) with the sample width mentioned below, a gauge length (distance between the jaws) as required to the test the subject specimen, and a crosshead speed of 508 mm/min. For the 10N extension test, the software (supplied by the manufacturer) is programmed to output the elongation in mm at the 10N load. For the peak load test, the software (supplied by the manufacturer) is programmed to output the load at sample failure.

The stretch laminate may have a CD elongation at 10N (force) in a range of 80-150% for a 50 mm sample width.

Figure 5A:
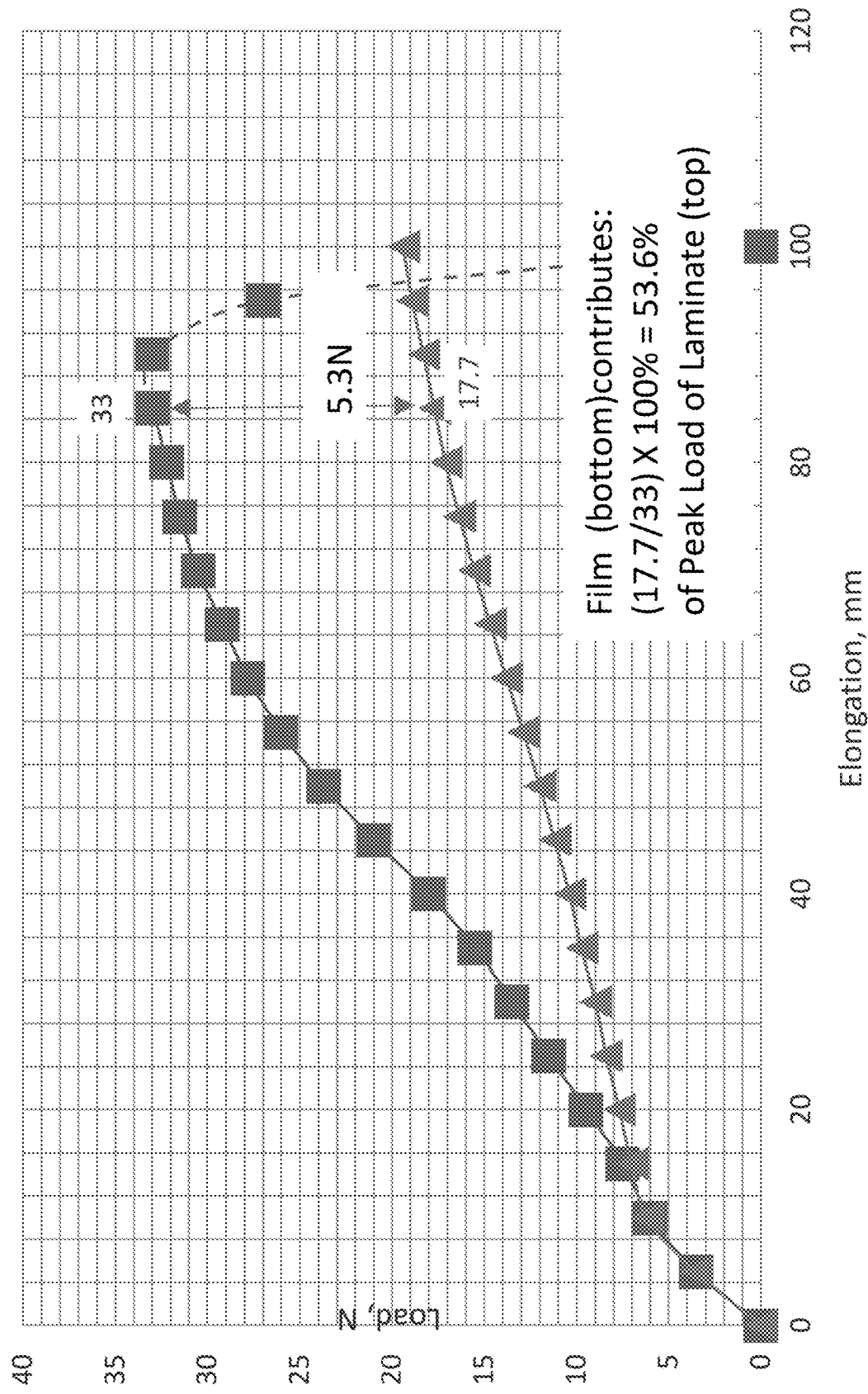
FIGS. 5A and 5B are graphs illustrating peak load of the stretch laminate and the elastic film.
Figure 5B:
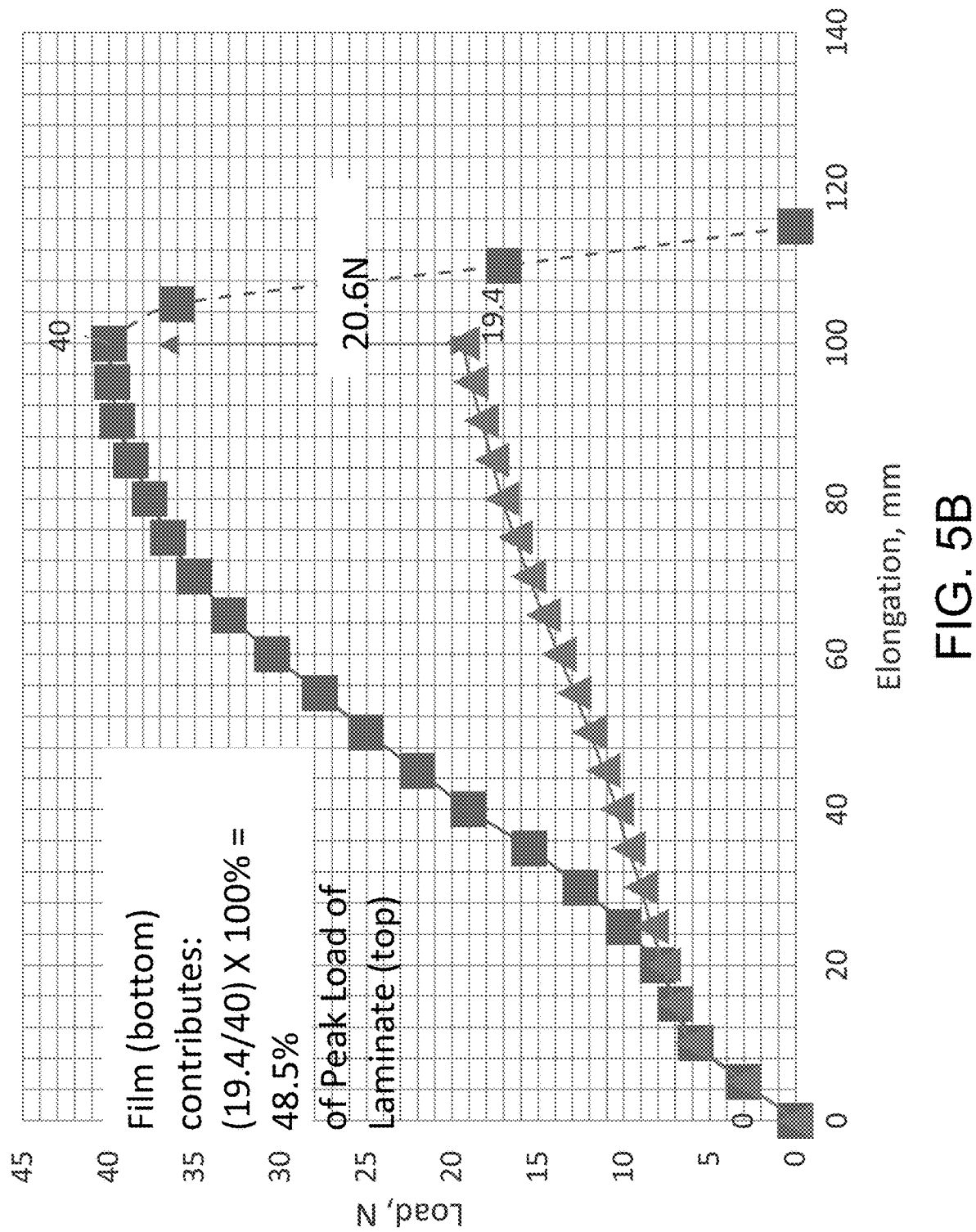

The stretch laminate may have a peak load at failure of at least 30 N for a 75 mm sample width. At peak load at failure of the stretch laminate, the elastic film may contribute at least 30% of the load. Alternatively, the elastic film may contribute in the range of 30-60% of the peak load at failure of the stretch laminate or 30-50% of the peak load at failure of the stretch laminate. At peak load at failure of the stretch laminate, the elastic film may contribute at least 15 N of the peak load of the stretch laminate. Alternatively, the elastic film may contribute in the range of 15-30 N of the peak load at failure of the stretch laminate or 15-25 N of the peak load at failure of the stretch laminate. For further explanation of contribution of the elastic film at peak load, see FIGS. 5A and 5B. In these graphs, the uppermost curve (with squares) represents the stress/strain curve of the stretch laminate, while the lowermost curve represents the stress/strain curve of the elastic film.

Fracture of the stretch laminate refers to the openings in the first nonwoven after (or caused by) stretching the stretch laminate and where the openings cause the elastic layer to be exposed through the first nonwoven. Exposure of the elastic layer through the first nonwoven is, at least, detrimental to the appearance of the stretch laminate. In one embodiment of the instant invention, the stretch laminate may have no fractures when stretched. In another embodiment, the stretch laminate may have less than 10% fractures. In yet another embodiment, the stretch laminate may have less than 5% fractures. In still other embodiments, the stretch laminate may have: 0-10% fractures, or 0-5% fractures, or 5-10% fractures (or any subset thereof).

Figure 6A:
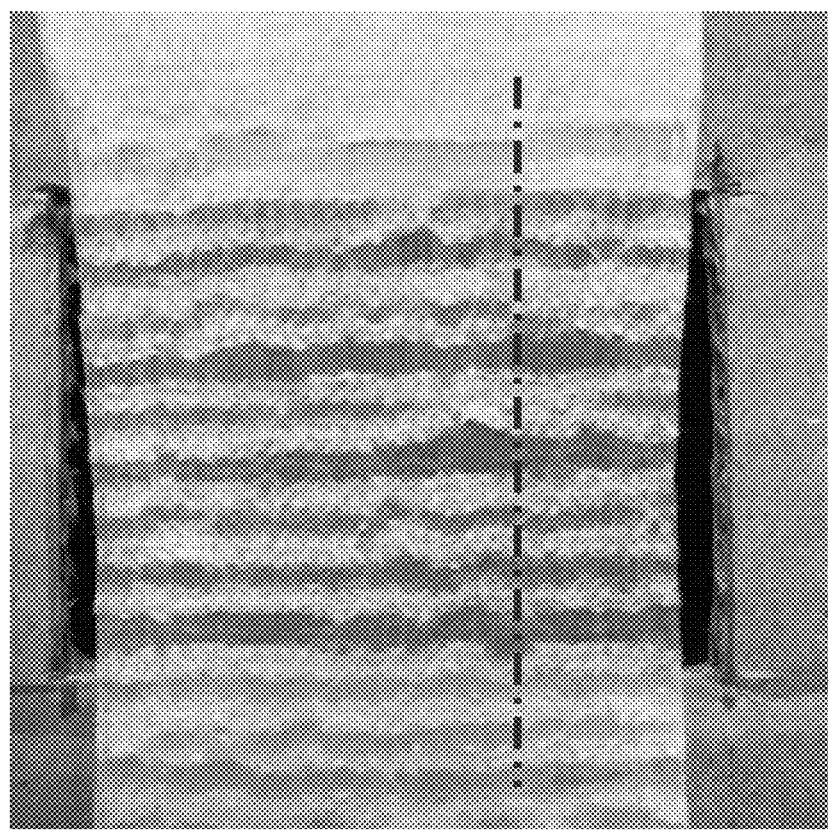
FIGS. 6A, 6B, and 6C illustrate the procedure for measuring fractures set forth herein.
Figure 6B:
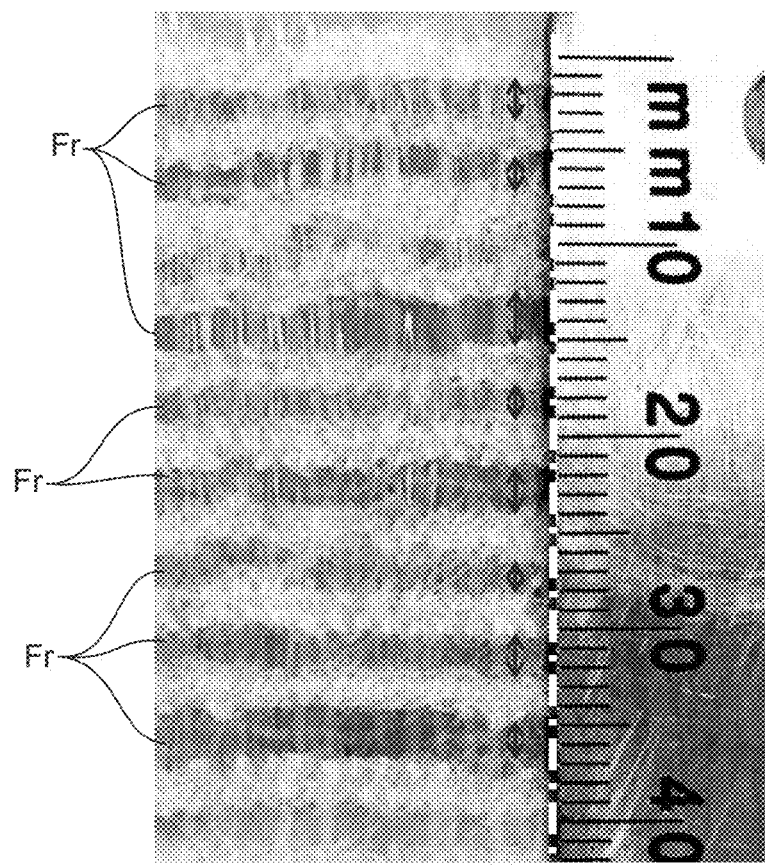
Figure 6C:
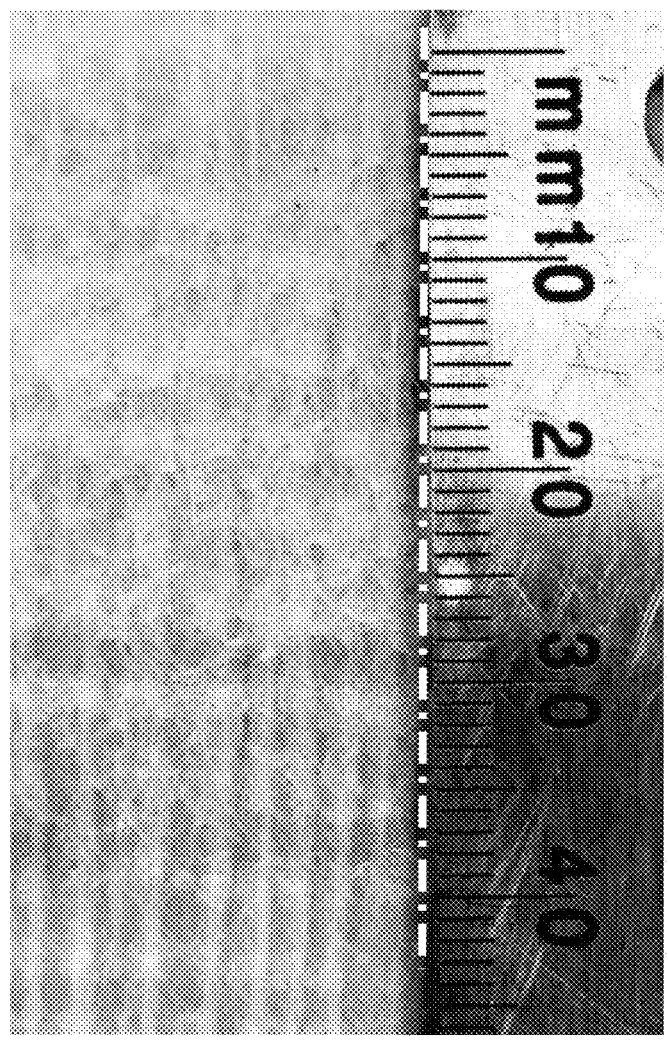
Figure 7A:
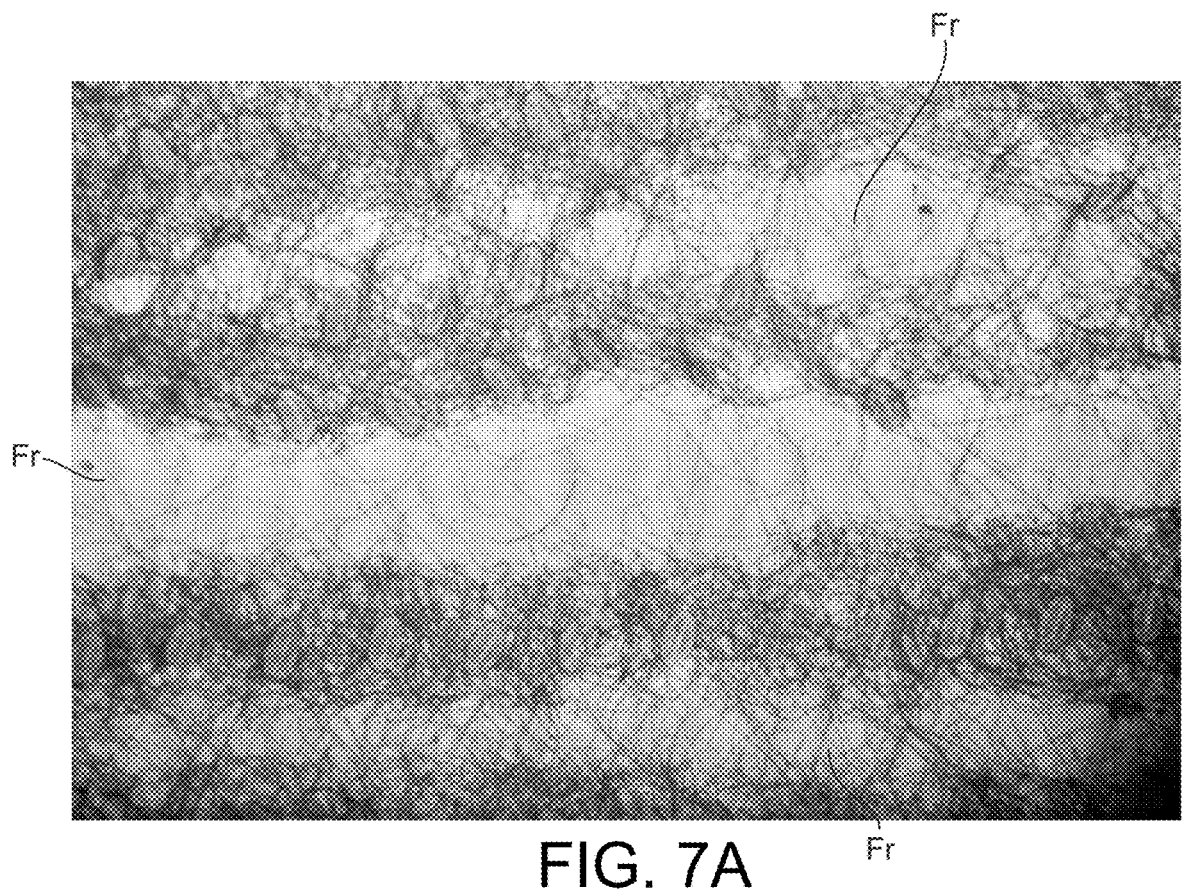
FIGS. 7A and 7B illustrate the concept of a fractured nonwoven, FIG. 7A, and a nonfractured nonwoven, FIG. 7B.
Figure 7B:
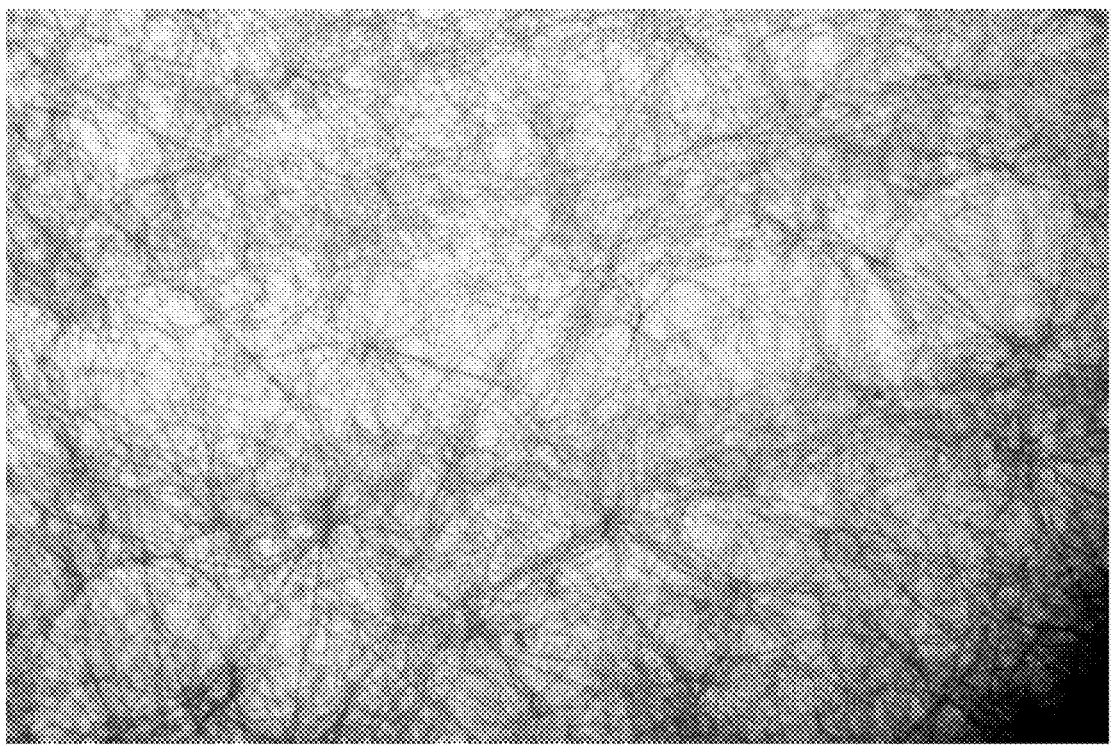

The procedure for measuring fractures, as used herein, is set forth below and with reference to FIGS. 6A, 6B (fractured—Fr), 6C (not fractured), and 7A (fractured) and 7B (not fractured). Procedure: 1) cut a 50 mm width sample of the stretch laminate (activated); 2) cut a 50 mm (width)×40 mm (length) window in a piece of cardboard; 3) elongate the sample 100% and place (attach) the sample over the window with the side being evaluated for fractures, face-up; 4) make a straight line in the cross direction, see FIG. 6A, any where along the sample width; 5) place a ruler along the straight line, see FIGS. 6B and 6C; 6) measure the length of each fracture in the 40 mm length, see the arrows in FIG. 6B, and sum those measured lengths. In FIG. 6B, the summed measured length is 15 mm, so the fracture is 15/40× 100=37%. In FIG. 6C,the summed measured length is 0 mm (or there is no area of fractured nonwoven), so the fracture is 0%. A fracture is a place (or area) of the nonwoven where the nonwoven has broken, and the film is exposed through the nonwoven (i.e., the film is naked); naked film refers to an area on the laminate where there is substantially no fiber covering the film. FIG. 7A shows a close up of a fractured nonwoven (fractures—Fr), and FIG. 7B shows a close up a nonfractured nonwoven. Note that FIG. 7A is substantially free of fibers in a band midway across this photograph of the nonwoven.

Alternate expressions of the invention include:

A stretch laminate for use in hygiene products comprises: an extensible, non-elastic spunbond or spunmelt nonwoven laminated to an elastic film; the spunbond or spunmelt nonwoven having an CD (cross machine direction) elongation at load peak in the range of 80-120% per 50 mm width; the elastic film having a modulus of from 0.045 to 0.065 N force/% strain over the range of 50-350% elongation; the stretch laminate is activated with an applied strain in the range of 130-180%; has a CD elongation at 10 N in a range of 80-150% for a 50 mm sample width, and has fractures of less than 10% of the stretch laminate. Where: the stretch laminate further comprises a second nonwoven, the spunbond or spunmelt nonwoven and the second nonwoven sandwiching the elastic film; the elastic film has a basis weight in the range of 30-60 gsm (or 40-60 gsm); the elastic film has a thickness in the range of 75-125 micrometers; the modulus of the elastic film is in the range of 0.050-0.060 N force/% strain over the range of 50-350% elongation; the stretch laminate has a peak load at failure of at least 30N for 75 mm sample width; the elastic film contributes at least 30% of the peak load at failure of the stretch laminate, preferably the elastic film contributes in a range of 30-60% of the peak load at failure of the stretch laminate or in a range of 30-50% of the peak load at failure of the stretch laminate; the elastic film contributes at least 15 N of the peak load at failure of the stretch laminate, preferably the elastic film contributes in a range of 15-30 N of the peak load at failure of the stretch laminate or in a range of 15-25 N of the peak load at failure of the stretch laminate.

A stretch laminate for use in hygiene products comprises: an extensible, non-elastic spunbond nonwoven, a second nonwoven, and an elastic film sandwiched therebetween; the spunbond or spunmelt nonwoven having an CD elongation at load peak in the range of 80-120% per 50 mm width; the elastic film having a basis weight in the range of 30-60 gsm (or 40-60 gsm), a thickness in the range of 75-125 micrometers, a modulus of from 0.045 to 0.065 N force/% strain over the range of 50-350% elongation; the stretch laminate is activated with an applied strain in the range of 130-180%; resulting in a stretch laminate with a CD elongation at 10 N in a range of 80-150% for a 50 mm sample width, a peak load at failure of at least 30 N for 75 mm sample width, and has less than 10% of the total stretch laminate is fractured. Where: the second nonwoven is an extensible, non-elastic carded nonwoven; the peak load at failure of the stretch laminate is in the range of 30-50 N or the peak load at failure of the stretch laminate is in the range of 40-50 N; the spunbond or spunmelt nonwoven is made of one material selected from the group of: polypropylene, polyester, polyethylene, polyamide (PA), acrylonitrile butadiene styrene (ABS), acrylic, polystyrene (PS), cellulosic, fluorocarbon, polylactic acid (PLA) or combinations thereof.

The foregoing invention may be further illustrated by the following non-limiting examples.

EXAMPLES

The following Tables describe several stretch laminates and their first nonwoven (Side 1).

TABLE 2

| Spunbond[1] | Basis weight[2] | CD Elongation at peak[3] | CD Peak Load[4] | Bonding[5] |
|---|---|---|---|---|
| A | 18 | 90 | 18 | 10.2 |
| B | 18 | 100 | 18 | 7 |
| C | 18.6 | 67 | 25 | 16-20 |

A - Fitesa CD Rod Supersoft
B - Texbond Blowbond (code KJ)
C - Berry (PGI Code 0111-26H)
[1] 50 mm width
[2] grams per square meter (gsm)
[3] %
[4] N/5 cm
[5] % area

TABLE 3

| Laminate | Side 1 | Side 2 | Activation Block | Elongation[1] (mm) | Elongation[2] (%) | Spunbond Nonwoven Condition | Load at Laminate Failure (N) | Increase in Failure Load[3] (N) |
|---|---|---|---|---|---|---|---|---|
| Film 1 - High Stretch Film formula: Film 200B | | | | | | | | |
| 1 | A | D | 130 | 40 | 100 | CF | 28 | N/A |
| 2 | B | D | 150 | 41 | 103 | CF | 33 | N/A |
| 3 | C | D | 130 | 45 | 113 | F | 18 | N/A |
| Film 2 - Low Stretch Film Formula: Film 212D | | | | | | | | |
| 4 | A | D | 140 | 37 | 93 | CF | 33 | 5 |
| 5 | B | D | 170 | 40 | 100 | CF | 40 | 7 |
| 6 | C | D | 140 | 37 | 93 | F | 24 | 6 |

A - 18 gsm Fitesa CD Rod
B - 18 gsm Texbond Blowbond
C - 18 gsm Berry
D - 22 gsm carded nonwoven
CF - nonwoven covers film
F - nonwoven fractures
[1] At 10N, 50 mm sample width, 40 mm gauge length, mm
[2] At 10N, 50 mm sample width, 40 mm gauge length, mm
[3] Increase in load at failure with Film 2

The present invention may be embodied in other forms without departing from the spirit and the essential attributes thereof, and, accordingly, reference should be made to the appended claims, rather than to the foregoing specification, as indicated the scope of the invention.

We claim:

1. A stretch laminate for use in hygiene products comprises:
   an extensible, non-elastic spunbond or spunmelt nonwoven laminated to an elastic film; and the stretch laminate is activated, has a cross direction (CD) elongation at 10N in a range of 80-150% for a 50mm sample width, has a peak load at failure of at least 30N for 75mm sample width, and has fractures (Fr) of less than 10% of the stretch laminate, and the elastic film contributes at least 30% of the peak load at failure of the stretch laminate and has a modulus of from 0.045 to 0.065 N force/% strain over the range of 50-350% elongation.

2. The stretch laminate of claim 1 further comprising a second nonwoven, the nonwoven and the second nonwoven sandwiching the elastic film.

3. The stretch laminate of claim 1 wherein the elastic film has a basis weight in the range of 30-60 grams per square meter (gsm) or 40-60 gsm.

4. The stretch laminate of claim 1 wherein the elastic film has a thickness in the range of 75-125 micrometers.

5. The stretch laminate of claim 1 wherein the elastic film contributes in a range of 30-60% of the peak load at failure of the stretch laminate, or the elastic film contributes in a range of 30-50% of the peak load at failure of the stretch laminate.

6. The stretch laminate of claim 1 wherein the elastic fila contributes at least 15 N of the peak load at failure, or the elastic film contributes in a range of 15-30 N of the peak load at failure, or the elastic film contributes in a range of 15-25 N of the peak load at failure.

7. The stretch laminate of claim 1 wherein the spunbond or spunmelt nonwoven has an CD (cross machine direction) elongation at peak load in the range of 80-120% per 50 mm width.

8. The stretch laminate of claim 1 wherein the elastic film having a modulus of from 0.050-0.060 N force/% strain over the range of 50-350% elongation.

9. The stretch laminate of claim 1 wherein the amount of stretch activation as measured by applied strain is in the range of 130-180%.

10. A method for reducing or eliminating fracturing of a nonwoven in a stretch laminate used in hygiene products, after the stretch laminate has been stretched comprising the steps of:
   providing a stretch laminate having
      an extensible, non-elastic spunbond or spunmelt nonwoven laminated to an elastic film,
      the stretch laminate is activated and has a CD elongation at 10 N in a range of 80-150% for a 50 mm sample width and has a peak load at failure of at least 30 N for 75 mm sample width, and the elastic film contributes at least 30% of the peak load at failure of the stretch laminate and has a modulus of from 0.045 to 0.065 N force/% strain over the range of 50-350% elongation, stretching the stretch laminate, and the stretch laminate having fractures (Fr) of less than 10% of the stretch laminate.

11. The method of claim 10 further comprising a second nonwoven, the spunbond or spunmelt nonwoven and the second nonwoven sandwiching the elastic film.

12. The method of claim 10 wherein the elastic film has a basis weight in the range of 30-60 grams per square meter (gsm) or 40-60 gsm.

13. The method of claim 10 wherein the elastic film has a thickness in the range of 75-125 micrometers.

14. The method of claim 10 wherein the spunbond or spunmelt nonwoven having a cross machine (CD) direction elongation at peak load in a range of 80-120% per 50 mm.

* * * * *